US009395605B2

(12) United States Patent
Hirota

(10) Patent No.: US 9,395,605 B2
(45) Date of Patent: Jul. 19, 2016

(54) ELECTRONIC APPARATUS HAVING MEMBER FOR LOCKING GRIP PART

(71) Applicant: CANON KABUSHIKI KAISHA, Tokyo (JP)

(72) Inventor: Norikazu Hirota, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/659,654

(22) Filed: Mar. 17, 2015

(65) Prior Publication Data

US 2015/0268535 A1 Sep. 24, 2015

(30) Foreign Application Priority Data

Mar. 19, 2014 (JP) ................................. 2014-056231

(51) Int. Cl.
*G03B 17/56* (2006.01)
*G03B 17/02* (2006.01)
*H04N 5/225* (2006.01)

(52) U.S. Cl.
CPC .............. *G03B 17/563* (2013.01); *G03B 17/02* (2013.01); *H04N 5/2252* (2013.01)

(58) Field of Classification Search
None
See application file for complete search history.

(56) References Cited

U.S. PATENT DOCUMENTS

| | | | | |
|---|---|---|---|---|
| 4,494,147 A * | 1/1985 | Komine | ............... | H04N 5/2251 348/341 |
| 4,959,729 A * | 9/1990 | Fukuda | ................ | H04N 5/2251 348/341 |
| 5,043,822 A * | 8/1991 | Ichiyoshi | ............. | H04N 5/2251 348/341 |
| 5,343,263 A * | 8/1994 | Takemae | .............. | H04N 5/2251 294/139 |
| 5,548,334 A * | 8/1996 | Ichiyoshi | ........... | H04N 5/23293 348/341 |
| 5,946,512 A * | 8/1999 | Lavine | ................... | G03B 17/02 348/E5.026 |
| 6,226,448 B1 * | 5/2001 | Takagi | .................. | H01R 35/02 348/207.99 |
| 7,391,467 B2 * | 6/2008 | Kim | ..................... | H04N 5/2251 348/220.1 |
| 7,726,890 B2 | 6/2010 | Misawa | | |
| 2004/0051811 A1 * | 3/2004 | Nakanishi | ............ | H04N 5/2251 348/375 |
| 2004/0169955 A1 * | 9/2004 | Tsuchida | ............. | H04N 5/2252 360/96.51 |
| 2005/0253959 A1 * | 11/2005 | Nakamura | ........... | H04N 5/2251 348/373 |

(Continued)

FOREIGN PATENT DOCUMENTS

JP 2005218050 A 8/2005

OTHER PUBLICATIONS

"XDCAM EX" Series Catalog, Jan. 2011, pp. 1-20, issued by Sony Corporation. Cited in the Specification.

*Primary Examiner* — Dennis Hogue
(74) *Attorney, Agent, or Firm* — Rossi, Kimms & McDowell LLP

(57) ABSTRACT

An electronic apparatus reduced in the number of components without impairing the operability of an unlocking operation part and an adjacent other operation part of a grip part. A digital video camera has a camera body and a grip part rotatable with respect to the camera body. A lock member within the grip part is rotatable in unison with the grip part, and is pivotally moved between a locking position for locking the grip part and an unlocking position for unlocking the same. A spring member urges the lock member toward the locking position. An operation knob formed on the lock member pivotally moves the lock member to the unlocking position against the urging force of the spring member. A recording start/stop button is formed in the lock member adjacent to the operation knob. The knob and the button are operated in respective different directions.

7 Claims, 7 Drawing Sheets

(56) References Cited

U.S. PATENT DOCUMENTS

| | | | |
|---|---|---|---|
| 2007/0161292 A1* | 7/2007 | Igarashi | H04N 5/2252 439/620.05 |
| 2009/0003821 A1* | 1/2009 | Son | G03B 17/00 396/423 |
| 2013/0108254 A1* | 5/2013 | Iinuma | G03B 17/563 396/420 |

* cited by examiner

ELECTRONIC APPARATUS HAVING MEMBER FOR LOCKING GRIP PART

BACKGROUND OF THE INVENTION

1. Field of the Invention

The present invention relates to an electronic apparatus, such as a digital camera or a digital video camera, which has a member for locking a grip part.

2. Description of the Related Art

There has been known a digital video camera or the like in which a grip part to be held by a user e.g. during photographing is configured to be rotatable with respect to a camera body (see Japanese Patent Laid-Open Publication No. 2005-218050). Further, there has been proposed a digital video camera having a grip part that can be rotated stepwise each through a predetermined angle with respect to a camera body and be locked at a predetermined rotational angle (see XDCAM EX Series Catalog issued by Sony Corporation in January, 2011). According to this proposal, when a user presses an unlock button perpendicularly to a gripping surface of the grip part, the grip part is unlocked, and rotation of the grip part is allowed.

However, the proposal in XDCAM EX Series Catalog issued by Sony Corporation in January, 2011 has a problem that the unlock button is configured to be pressed in the same direction as a direction in which a photographing start/stop button is pressed, which is apt to cause an erroneous operation.

However, if the unlock button is disposed apart from the photographing start/stop button so as to prevent occurrence of the erroneous operation, a problem in operability will occur because the two buttons are configured to be operated by the same finger.

Further, the grip part is unlocked by converting the pressing operation of the unlock button into rotation of a lock member, which makes it necessary to provide a link mechanism for the conversion, resulting in increased manufacturing costs due to an increase in the number of components.

SUMMARY OF THE INVENTION

The present invention provides an electronic apparatus which makes it possible not only to achieve reduction of the number of component parts and manufacturing costs of the apparatus without impairing the operability of an unlocking operation part and another operation part adjacent thereto of a grip part, which are operated by the same finger, but also to prevent the operation parts from being erroneously operated.

The present invention provides an electronic apparatus comprising an apparatus body, a grip part configured to be rotatable with respect to the apparatus body and be gripped by a user, a lock member provided within the grip part and configured to be rotatable in unison with the grip part and pivotally move between a locking position for locking the grip part at a predetermined rotational angle and an unlocking position for unlocking the grip part, an urging member configured to urge the lock member toward the locking position, an unlocking operation part formed integrally with the lock member and disposed in a manner protruding from an opening formed in an exterior of the grip part, the unlocking operation part enabling an operation for pivotally moving the lock member to the unlocking position against an urging force of the urging member, and another operation part formed in the grip part in a manner adjacent to the unlocking operation part, wherein an operational direction of the unlocking operation part and an operational direction of the other operation part are different from each other.

According to the present invention, it is possible not only to achieve reduction of the number of component parts and manufacturing costs of the apparatus without impairing the operability of the unlocking operation part and the other operation part adjacent thereto of the grip part, but also to prevent the operation parts from being erroneously operated.

Further features of the present invention will become apparent from the following description of exemplary embodiments (with reference to the attached drawings).

DESCRIPTION OF THE EMBODIMENTS

The present invention will now be described in detail below with reference to the accompanying drawings showing an embodiment thereof.

Figure 1A:
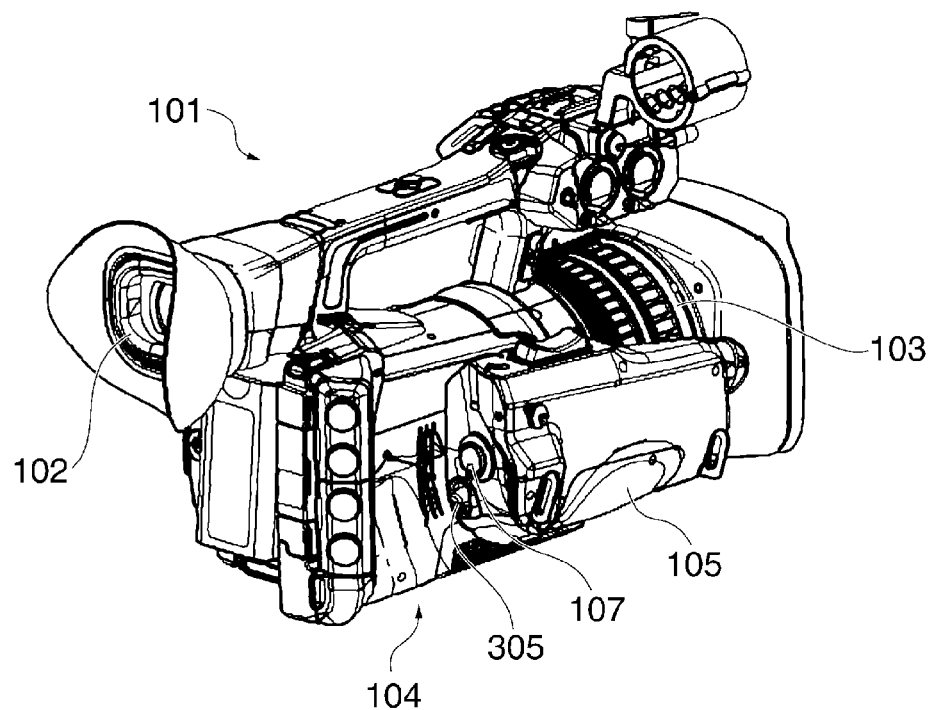
FIG. 1A is a perspective view of a digital video camera as an electronic apparatus according to an embodiment of the present invention, as viewed from the rear of the same.
Figure 1B:
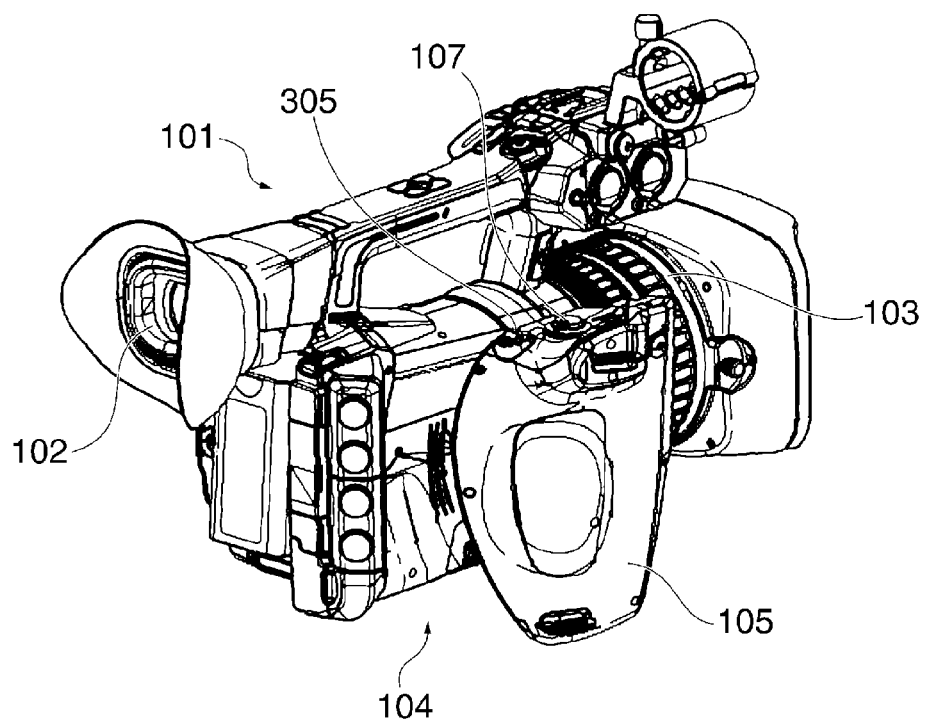
FIG. 1B is a perspective view of the digital video camera in FIG. 1A with a grip part rotated.

FIG. 1A is a perspective view of a digital video camera as an electronic apparatus according to the embodiment, as viewed from the rear of the same, and FIG. 1B is a perspective view of the digital video camera in FIG. 1A with a grip part rotated.

As shown in FIGS. 1A and 1B, the digital video camera 101 of the present embodiment has a lens barrel 103 provided on the front side (object side) of a camera body 104 and a viewfinder 102 provided on the rear side of the same. On the right side of the camera body 104, as viewed from the rear of the same, there is provided the grip part 105 to be held by a user e.g. when photographing. The camera body 104 corresponds to an apparatus body of the present invention.

The grip part 105 can be rotated stepwise each through a predetermined angle about a rotational axis extending orthogonally to the right side of the camera body 104, as viewed from the rear of the same, and be locked at a predetermined rotational angle. The grip part 105 has provided thereon an operation knob 305 for unlocking the grip part 105 and a video recording start/stop button 107, at respective locations adjacent to each other. The operation knob 305 functions as an unlocking operation part of the present invention, and the video recording start/stop button 107 functions as another operation part of the present invention.

When pressed from the rear side toward the front side in the FIG. 1A state, the video recording start/stop button 107 instructs a control circuit of the camera body 104 to start or stop video recording.

Figure 2A:
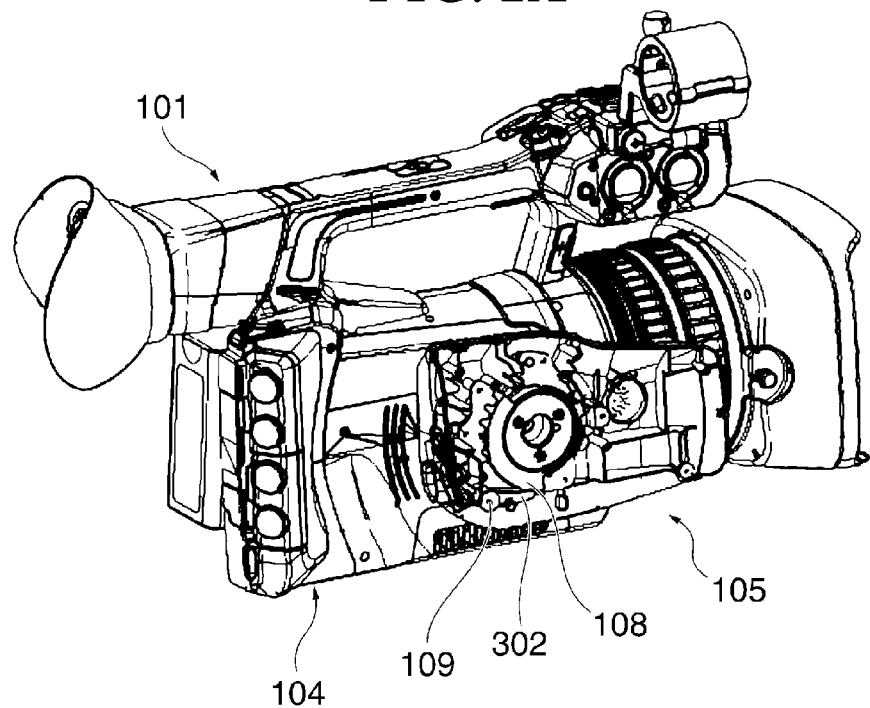
FIG. 2A is a perspective view of the digital video camera with an exterior cover of the grip part removed in the FIG. 1A state.

When the operation knob 305 is operated, the grip part 105 is unlocked. As a consequence, the grip part 105 is allowed to rotate with respect to the camera body 104 from the state shown in FIG. 1A e.g. to the state shown in FIG. 1B. Note that an operational direction of the operation knob 305 will be described hereinafter. FIG. 2A is a perspective view of the digital video camera 101 with an exterior cover of the grip part 105 removed in the FIG. 1A state, and FIG. 2B is a perspective view of the same with the exterior cover of the grip part 105 removed in the FIG. 1B state.

Figure 2B:
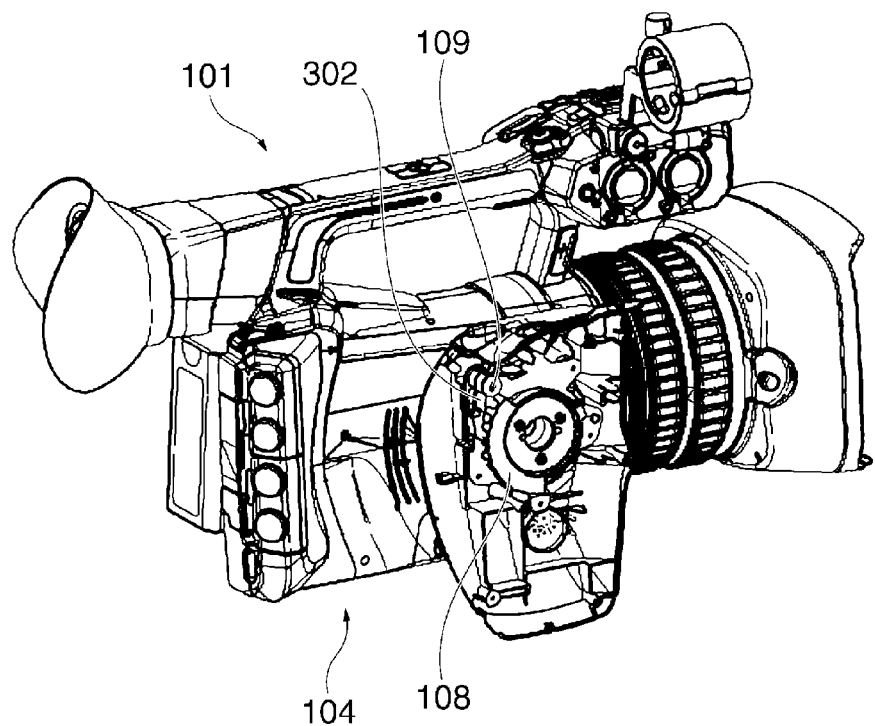
FIG. 2B is a perspective view of the digital video camera with the exterior cover of the grip part removed in the FIG. 1B state.

As shown in FIGS. 2A and 2B, a gear member 108 is fixedly secured to a portion of the camera body 104, for supporting rotation of the grip part 105. A lock mechanism 109 of the grip part 105 is formed by the gear member 108, a lock member 302 that rotates within the grip part 105 together with the same, and a spring member 304 referred to hereinafter. The lock mechanism 109 will be described in detail hereinafter.

Figure 3A:
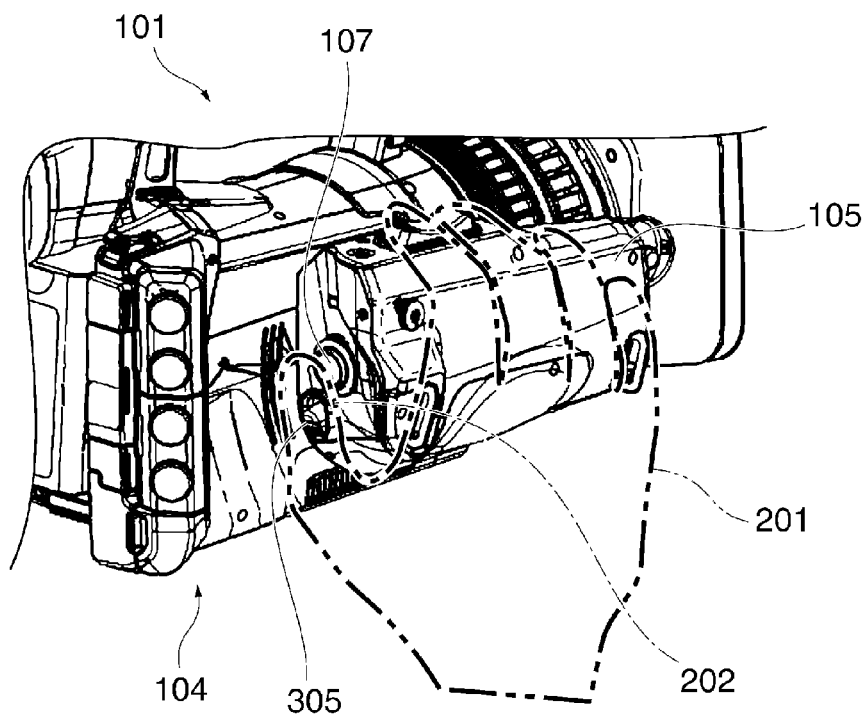
FIG. 3A is a perspective view which is useful in explaining a state of use of the digital video camera.
Figure 3B:
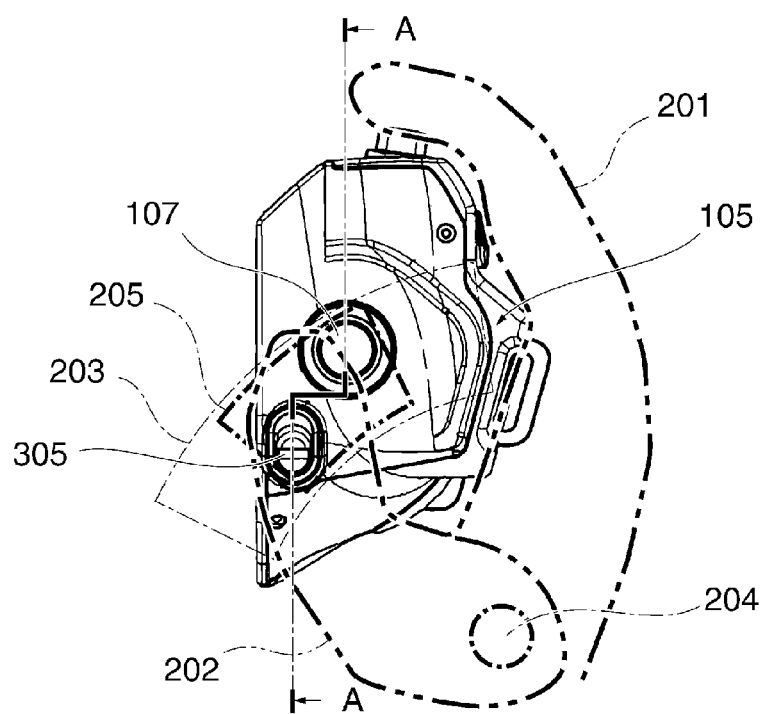
FIG. 3B is a view of the grip part in the FIG. 3A state, as viewed from the rear of the digital video camera.

FIG. 3A is a perspective view which is useful in explaining a state of use of the digital video camera 101, and FIG. 3B is a view of the grip part 105 in the FIG. 3A state, as viewed from the rear of the digital video camera 101.

As shown in FIG. 3A, the digital video camera 101 is used with the grip part 105 of the camera body 104 held by a user's right hand 201. The operation knob 305 and the video recording start/stop button 107 are disposed at the respective locations where each of them can be operated by the thumb 202 of the user's right hand 201.

As shown in FIG. 3B, an operable range 203 where the user can operate the operation knob 305 and the video recording start/stop button 107 by the tip of the thumb 202 of his/her right hand 201 while holding the grip part 105 corresponds to a sector-shaped range (indicated by a one-dot chain line) around a base 204 of the thumb 202. Further, an easily operable range 205 where the user can operate the operation knob 305 and the video recording start/stop button 107 by the tip of the thumb 202 without difficulty corresponds to a limited central range (indicated by a bold one-dot chain line) in the operable range 203.

When operation parts to be operated in the same direction coexist within the easily operable range 205 where the same finger can be used for the operation, there is a fear that an erroneous operation occurs. Erroneous operation of an operation part, such as the video recording start/stop button 107, which plays a most important role in operation related to the video recording function of the digital video camera 101, has to be avoided.

Next, a description will be given, with reference to FIGS. 4A and 4B and FIGS. 7A and 7B, of operation of the operation knob 305 and the lock mechanism 109.

Figure 4A:
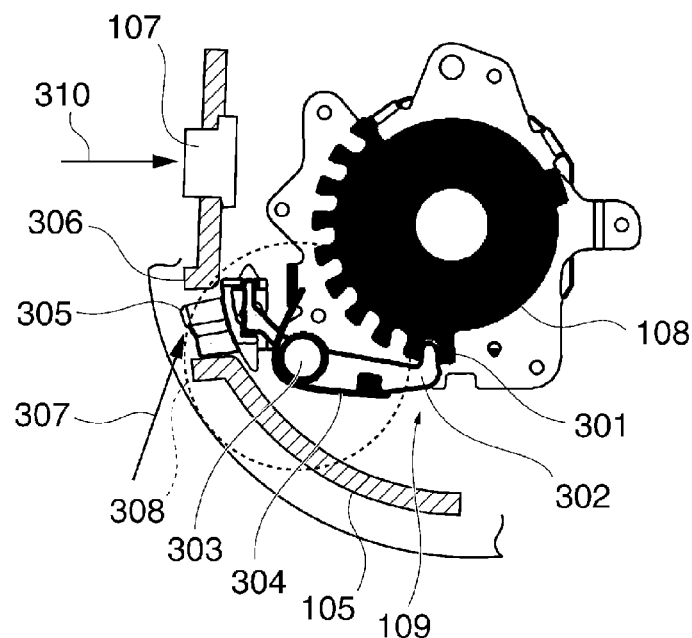
FIG. 4A is a cross-sectional view taken on line A-A of FIG. 3B and showing a state where the grip part is locked from rotation.
Figure 4B:
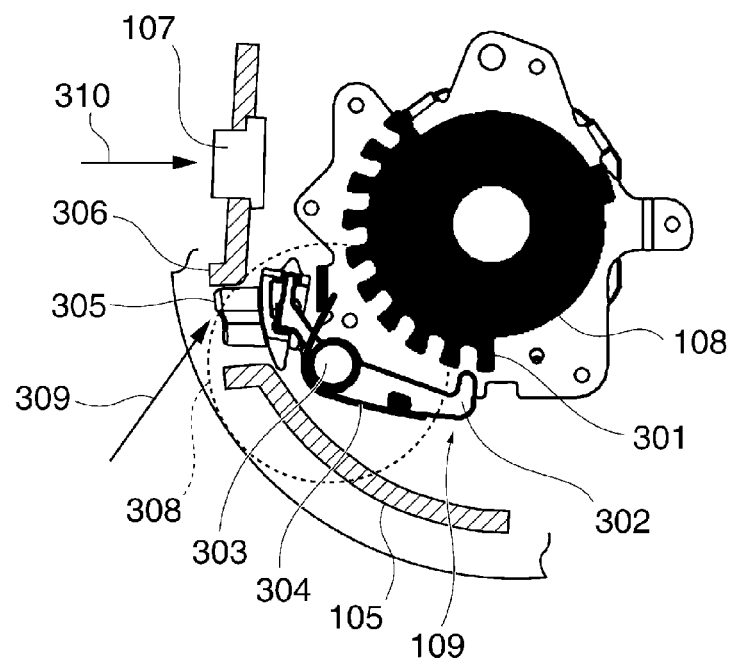
FIG. 4B is a cross-sectional view taken on line A-A of FIG. 3B and showing a state where the grip part is unlocked for rotation.

FIG. 4A is a cross-sectional view taken on line A-A of FIG. 3B and showing a state where the grip part 105 is locked from rotation, and FIG. 4B is a cross-sectional view taken on line A-A of FIG. 3B and showing a state where the grip part 105 is unlocked for rotation.

As shown in FIGS. 4A and 4B, the lock mechanism 109 includes the gear member 108 which is fixedly disposed, and the gear member 108 is formed with gear teeth 301 circumferentially arranged at substantially equal intervals (e.g. at angular intervals of 15° in FIGS. 4A and 4B). The lock member 302, which pivotally moves about a pivot shaft 303 within the grip part 105, is disengageably brought into engagement with the gear teeth 301. The lock member 302 is provided with the spring member 304 that urges the same in a direction for engagement with the gear teeth 301. The gear member 108 functions as an example of an engagement member of the present invention, and the gear teeth 301 function as an example of engagement portions of the present invention. Further, the spring member 304 functions as an example of an urging member of the present invention.

The lock member 302 can be pivotally moved between a position (see FIG. 4B) for being separated from the gear teeth 301 to unlock the grip part 105 for rotation and a position (see FIG. 4A) for being brought into engagement with the gear teeth 301 to lock the grip part 105 from rotation. The operation knob 305 is integrally fixed to the lock member 302.

The operation knob 305 projects from the exterior cover 306 of the grip part 105 in a manner operable from outside. In order to unlock the grip part 105 for rotation, the user applies force to the operation knob 305 by the tip of the thumb 202 (see FIGS. 3A and 3B) in a direction indicated by an arrow 307 in FIG. 4A, against the urging force of the spring member 304. This operational direction indicated by the arrow 307 corresponds to a direction of the tangent to the trajectory 308 of rotation of the operation knob 305 about the pivot shaft 303 of the lock member 302.

The amount of protrusion of the operation knob 305 from an opening of the exterior cover 306 is smaller in the unlocking position shown in FIG. 4B than in the locking position shown in FIG. 4A. For this reason, although the operation knob 305 is pivotally moved about the pivot shaft 303, the amount of protrusion of the operation knob 305 from the exterior cover 306 is progressively reduced, and hence the user can have a feeling of operation similar to that of a push-in button configured to be axially pressed in.

The operational direction of the operation knob 305 progressively changes from the direction indicated by the arrow 307 in FIG. 4A to a direction indicated by an arrow 309 in FIG. 4B, but still, it is different from an operational direction 310 of the video recording start/stop button 107. This makes it impossible for the user to press the operation knob 305 of the lock member 302 in the operational direction 310 of the video recording start/stop button 107, so that occurrence of an erroneous operation can be avoided.

Figure 5A:
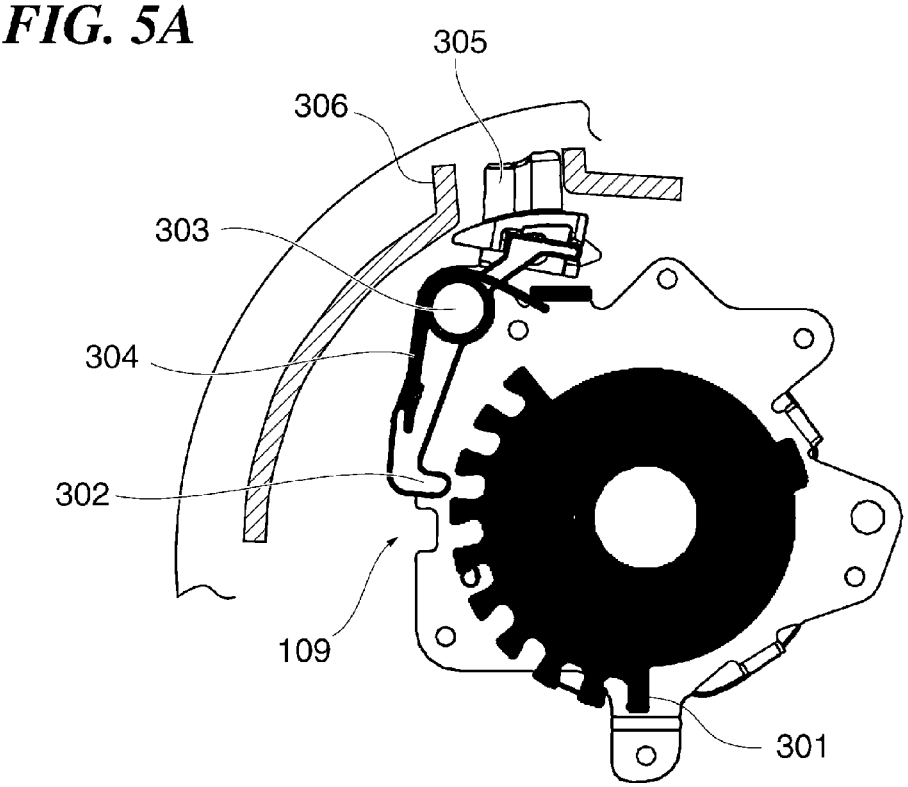
FIG. 5A is a cross-sectional view showing a state where the grip part has been rotated through 90° from the unlocked state shown in FIG. 4B.
Figure 5B:
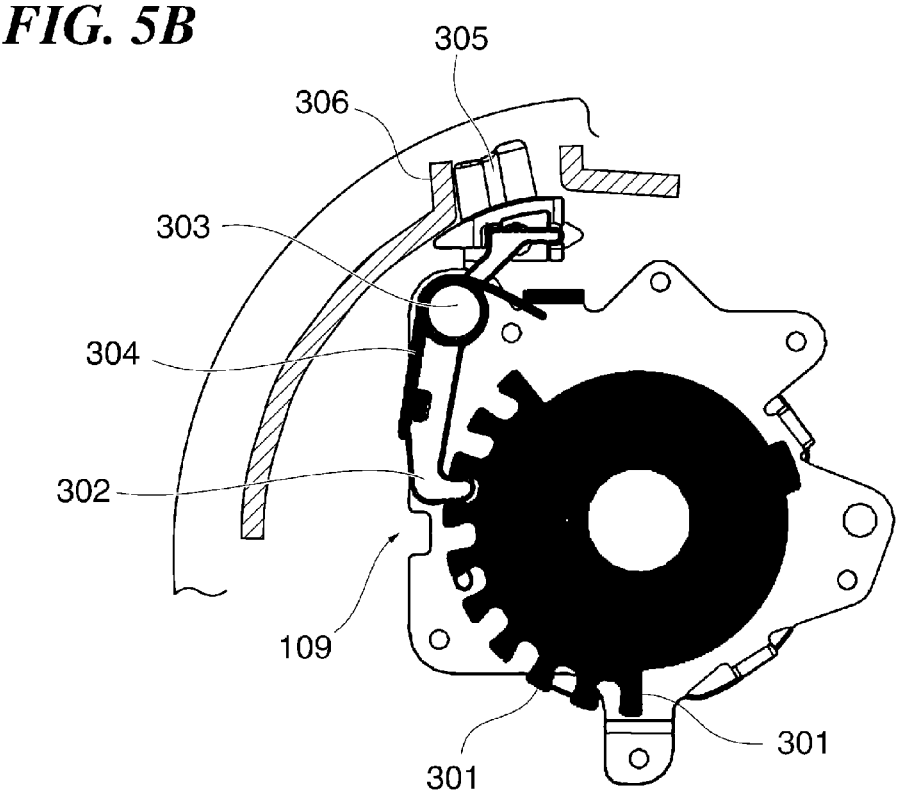
FIG. 5B is a cross-sectional view showing a state where the grip part is locked in the rotational position shown in FIG. 5A.

FIG. 5A is a cross-sectional view showing a state where the grip part 105 has been rotated through 90° in a clockwise direction, from the unlocked state shown in FIG. 4B. FIG. 5B is a cross-sectional view showing a state where the grip part 105 is locked in a rotational position shown in FIG. 5A.

In the unlocking position, shown in FIG. 4B, of the lock member 302, the grip part 105 is allowed to rotate relative to the camera body 104, and the user rotates the grip part 105 to thereby bring the same into the state shown in FIG. 5A. When the user moves the thumb 202 off the operation knob 305 in this state, the lock member 302 is pivotally moved by the urging force of the spring member 304 in the direction for engagement with the gear teeth 301 to be brought into engagement with the same. This causes the grip part 105 be held in the state locked to the camera body 104, as shown in FIG. 5B.

Figure 6A:
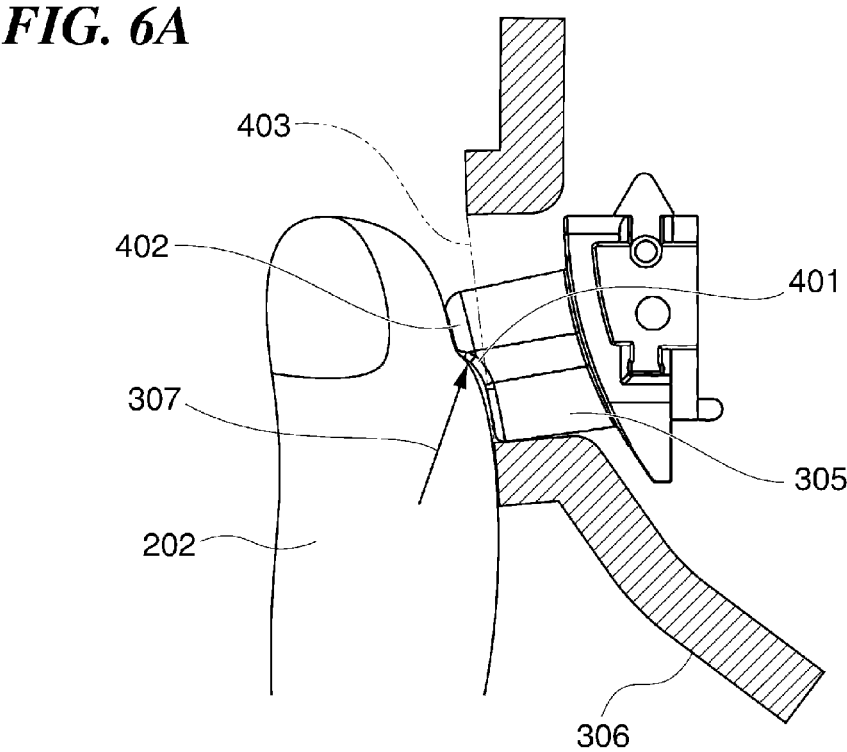
FIG. 6A is a schematic view of an operation knob and component parts associated therewith in the state where the grip part is locked.

Next, a description will be given, with reference to FIGS. 6A and 6B, of the shape of the operation knob 305. FIG. 6A is a schematic view of the operation knob 305 and component parts associated therewith in the state where the grip part 105 is locked, and FIG. 6B is a schematic view of the operation knob 305 and component parts associated therewith in the state where the grip part 105 is unlocked.

Figure 6B:
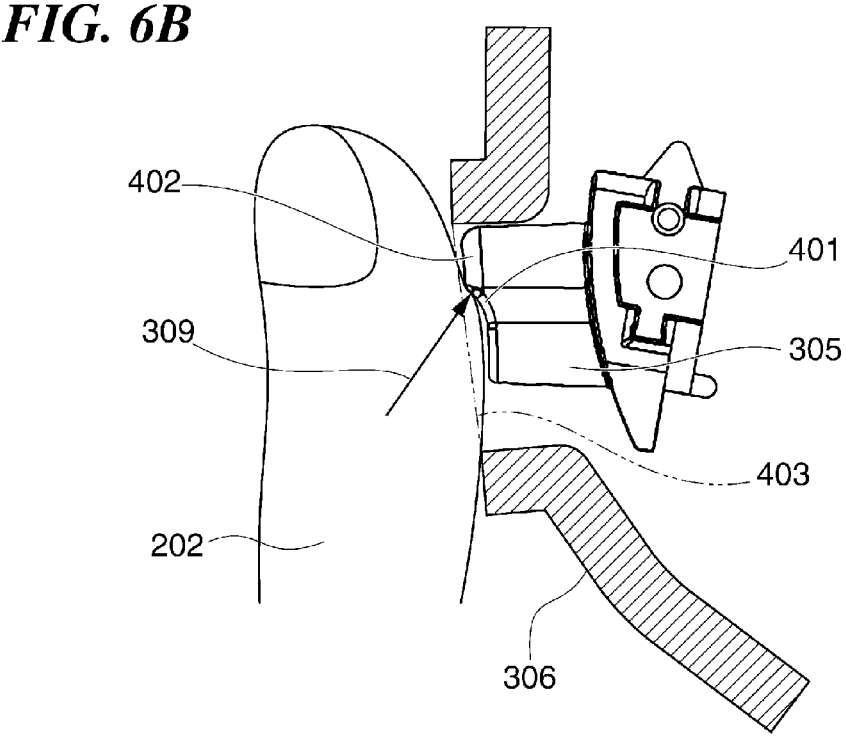
FIG. 6B is a schematic view of the operation knob and the component parts associated therewith in the state where the grip part is unlocked.

As shown in FIGS. 6A and 6B, the operation knob 305 has a push-in surface 401 that can be pushed by the user's thumb 202 in the operational direction indicated by the arrow 307 and a protrusion 402 formed such that it is continuous with the push-in surface 401 in the push-in direction and protrudes from the same.

In the state where the grip part 105 is locked, the protrusion 402 protrudes from the opening 403 of the exterior cover 306. When the operation knob 305 is pivotally moved (pushed in) to the unlocking position of the lock member 302 against the urging force of the spring member 304, the protrusion 402 is positioned substantially flush with an uppermost surface of the exterior cover 306. This makes it possible to provide the operation feeling similar to that provided by a push-in button configure to be axially pushed in, as described hereinbefore.

Figure 7A:
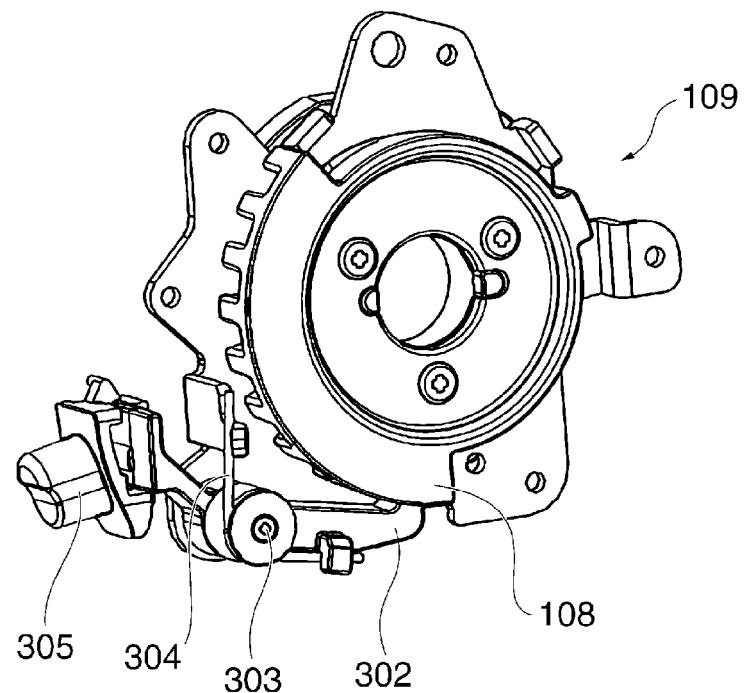
FIG. 7A is a perspective view of the appearance of a lock mechanism.
Figure 7B:
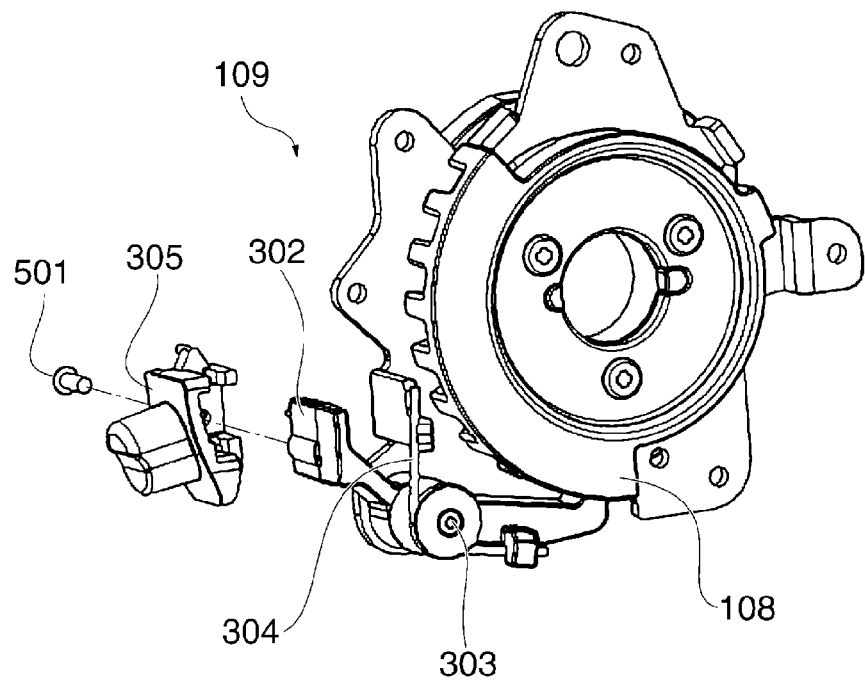
FIG. 7B is an exploded perspective view of the lock mechanism shown in FIG. 7A.

FIG. 7A is a perspective view of the appearance of the lock mechanism 109, and FIG. 7B is an exploded perspective view of the lock mechanism 109 shown in FIG. 7A.

The operation knob 305 is fastened to the lock member 302 with a screw 501, as shown in FIGS. 7A and 7B, so as to be pivotally moved in unison with the lock member 302. Only the lock member 302, the operation knob 305, and the spring member 304 are required for unlocking the grip part 105 as described above, and therefore it is possible to dispense with a link mechanism for converting the pivotal motion of the lock member 302 to press-in operation or a dedicated spring member for the operation knob 305. This makes it possible to reduce the number of component parts, and further reduce the number of portions where wear or the like is caused by an increase in the number of operations, and hence it is possible to realize a highly reliable lock mechanism.

As described above, according to the present embodiment, it is possible not only to achieve reduction of the number of component parts and manufacturing costs of the apparatus without impairing the operability of the operation knob 305 and the photographing start/stop button 107, which are operated by the same finger (thumb) 202, but also to prevent the operation parts from being erroneously operated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, although in the above-described embodiment, the lock member 302 and the operation knob 305 are provided as separate members, this is not limitative, but it is possible to construct the lock member 302 and the operation knob 305 as a unitary member, by forming the lock member 302 into a shape that enables a user to operate the same from outside.

Further, although in the above-described embodiment, the video recording start/stop button 107 is exemplified as another operation part, this is not limitative, but the other operation part may be e.g. a power-on/off operation button.

This application claims the benefit of Japanese Patent Application No. 2014-056231 filed Mar. 19, 2014 which is hereby incorporated by reference herein in its entirety.

What is claimed is:

1. An electronic apparatus comprising:
   an apparatus body;
   a grip part configured to be rotatable with respect to said apparatus body and be gripped by a user;
   a lock member provided within said grip part and configured to be rotatable in unison with said grip part and pivotally move between a locking position for locking said grip part at a predetermined rotational angle and an unlocking position for unlocking said grip part;
   an urging member configured to urge said lock member toward the locking position;
   an unlocking operation part formed integrally with said lock member and disposed in a manner protruding from an opening formed in an exterior of said grip part, said unlocking operation part enabling an operation for pivotally moving said lock member to the unlocking position against an urging force of said urging member; and
   another operation part formed in said grip part in a manner adjacent to said unlocking operation part,
   wherein an operational direction of said unlocking operation part and an operational direction of said other operation part are different from each other.

2. The electronic apparatus according to claim 1, wherein an amount of protrusion of said unlocking operation part from the opening changes between when said lock member is in the locking position and when said lock member is in the unlocking position.

3. The electronic apparatus according to claim 2, wherein the amount of protrusion of said unlocking operation part from the opening is smaller when said lock member is in the unlocking position than when said lock member is in the locking position.

4. The electronic apparatus according to claim 1, wherein said unlocking operation part and said other operation part can be operated by the same finger.

5. The electronic apparatus according to claim 1, wherein said grip part is configured to be rotatable stepwise each through a predetermined angle with respect to said apparatus body, and
   wherein within said grip part, there is provided an engagement member fixedly secured to said apparatus body and including a plurality of engagement portions with each of which said lock member is disengageably brought into engagement at each position where said grip part is rotated through the predetermined angle, to lock said grip part.

6. The electronic apparatus according to claim 1, wherein said other operation part is configured to perform one of a photographing start/stop operation and a power-on/off operation.

7. The electronic apparatus according to claim 1, wherein the electronic apparatus is an image pickup apparatus.

* * * * *